Aug. 24, 1926.
A. A. WARNER ET AL
ELECTRIC TOASTER
Filed Dec. 11, 1924   2 Sheets-Sheet 1
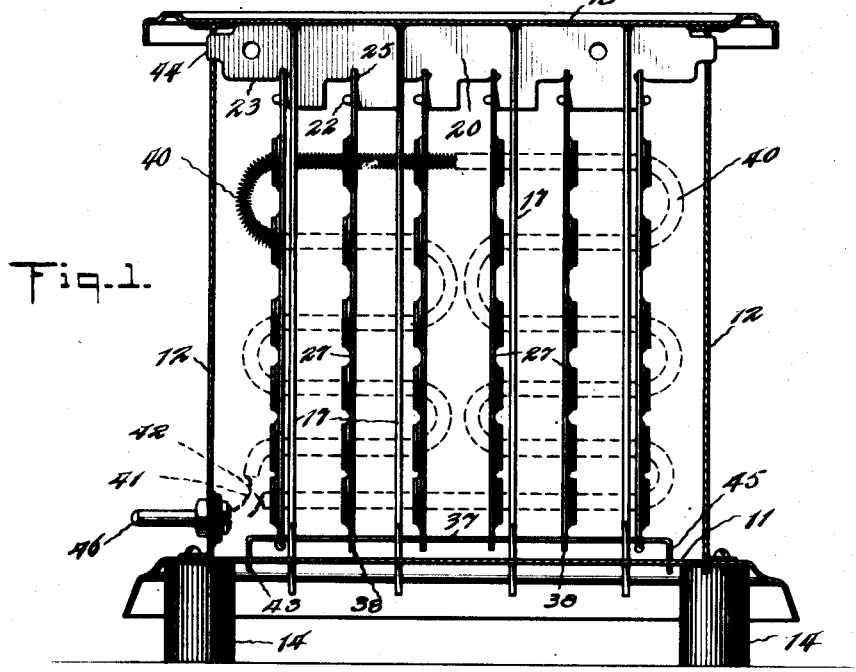
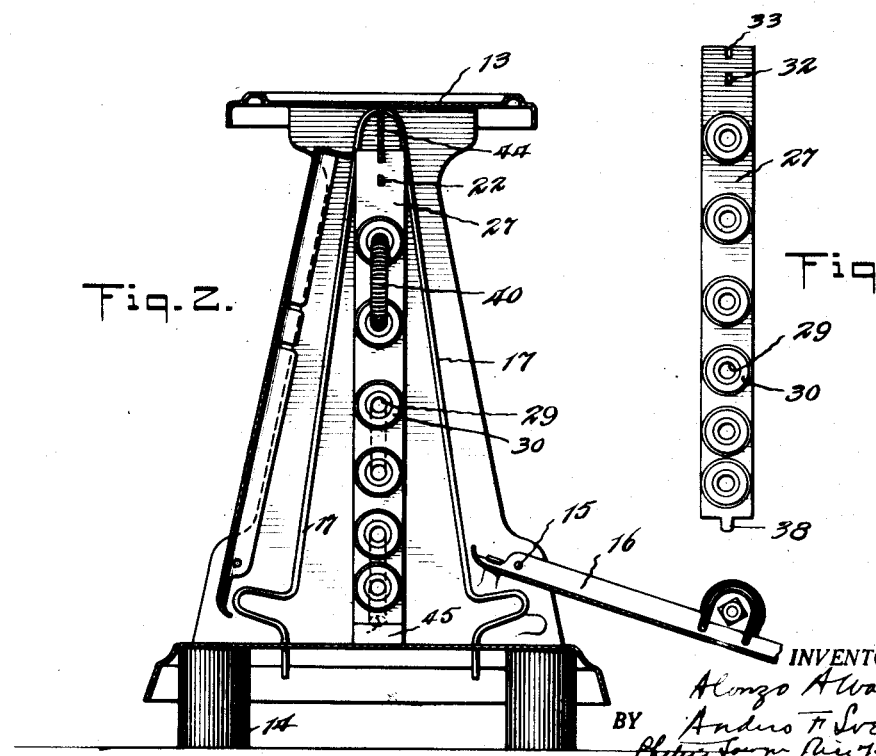
INVENTORS
Alonzo A. Warner
Andro F. Svenak
BY
ATTORNEYS.

Aug. 24, 1926.

A. A. WARNER ET AL 1,597,304

ELECTRIC TOASTER

Filed Dec. 11, 1924      2 Sheets-Sheet 2

INVENTORS
Alonzo A Warner
Andrew F Svumak
BY
Philips Sawyer Rice Kennedy
ATTORNEYS Patented Aug. 24, 1926.

1,597,304

UNITED STATES PATENT OFFICE.

ALONZO A. WARNER AND ANDERS F. SVENSK, OF NEW BRITAIN, CONNECTICUT, AS-SIGNORS TO LANDERS, FRARY & CLARK, OF NEW BRITAIN, CONNECTICUT, A CORPORATION OF CONNECTICUT.

ELECTRIC TOASTER.

Application filed December 11, 1924. Serial No. 755,145.

This invention relates to electric toasters.

It is the principal object of the invention to provide a toaster such that a heating unit may be independently assembled and such that the assembly operation may be readily and economically performed.

With this general object in view the invention consists in the combinations, features, details of construction, and arrangement of parts which will first be described in connection with the accompanying drawings and then more particularly pointed out.

In the drawings:—

Figure 1 is a view partly in vertical section and partly in side elevation of a toaster constructed in accordance with the invention;

Figure 2 is a view of the same partly in transverse section and partly in end elevation;

Figure 3 is a detail face view of one of the eyeleted bars removed;

Figure 4:
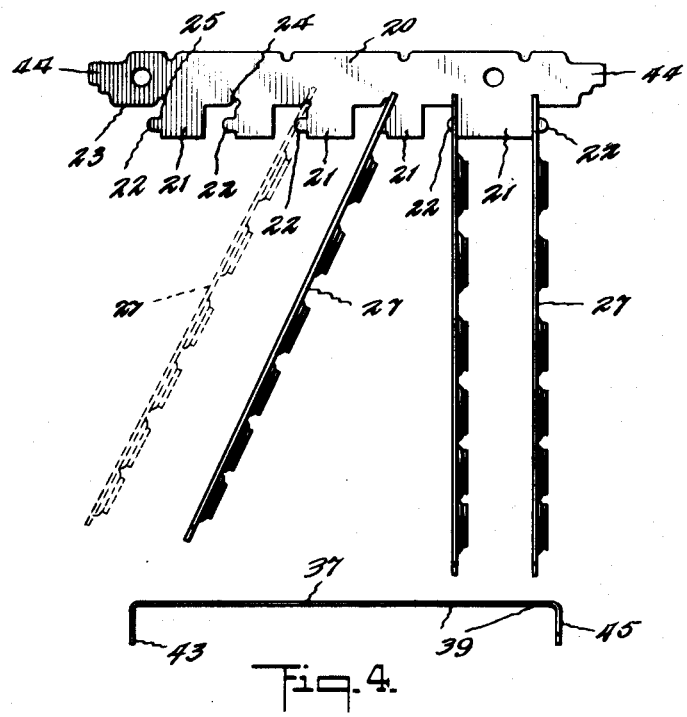
Figure 4 is a detail explanatory view showing certain of the parts in process of assembly.
Figure 5:
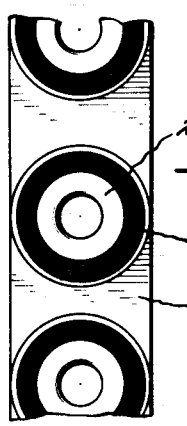
Figure 5 is a detail view showing part of Fig. 3 enlarged.

Referring to the drawings, the toaster illustrated comprises a main frame and a supplemental resistor-carrying frame which may be separately assembled as a unit and then assembled with the main frame. The main frame shown as an example comprises a base 11, end standards 12 and a cover 13. The base is supported by heat-insulating feet 14. Pivoted in the main frame in any suitable manner, as by pins 15, are the usual flaps 16. An inclined grid on each side of the toaster is provided by a number of hairpin shaped wires 17 hung from part of the supplemental frame and having their ends stuck through holes in the base 11. These wires are shouldered near the bottom as appears in Fig. 2, to provide a seat for the bottom edge of the bread to be toasted.

The supplemental frame here illustrated comprises top and bottom cross pieces and a number of upright eyeleted bars, arranged in an independent portable unit.

Figure 6:
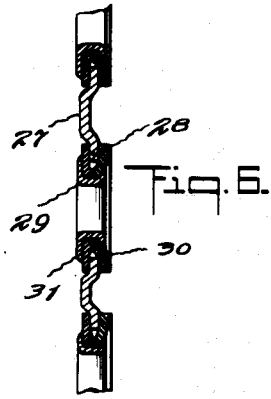
Figure 6 is a longitudinal sectional view through the center of Fig. 5.

The eyeleted bars comprise long flat strips 27 having a number of dished portions 28 which are perforated. Set in these perforations are metal eyelets 29 insulated by mica washers 30, 31, which are gripped between the eyelets and the edge of the bar embracing the perforations (Fig. 6). The resistor wire is threaded through these eyelets as later described.

In constructions embodying the invention in its entirety the eyeleted bars and the two cross pieces are united in a substantially rigid, portable frame without the use of extraneous fastening devices. To this end, in the present embodiment, there is provided a tongue and slot connection between each bar 27 and the top cross piece such that a bar may be manipulated into position and is thereafter held against movement other than the reverse of assembling movement. As here shown as an example, the upper cross piece is a flat plate 20 positioned in a vertical plane. Depending from the lower edge 23 of the plate 20 are a plurality of spaced projections 21 formed as an integral part of the plate. Extending sidewise from each projection (to the left as viewed in Figs. 1 and 4), is a tongue 22 located slightly above the bottom edge of the projection. Above each tongue 22, at the corner where the edge of projection adjoins the lower edge of the plate 20, is an oblique notch 25 leading upwardly and in a direction opposite to the tongue, namely, upwardly and to the right as viewed in Figs. 1 and 4.

To cooperate with the tongues 22, each bar 27 has a slot 32 (Fig. 3) and to cooperate with notches 25 each bar has a notch 33. In assembled position the plane of a bar 27 is at right angles to the plane of plate 20 so that the slot 32 can take over tongue 22 and the two notches can make inter-engagement. To assemble a bar 27 it is placed in an oblique position with its notch 33 straddling plate 20 adjacent notch 25 and moved upwardly as far as the cooperating notches will permit. In this position, the slot 32 is opposite the tongue 22. This position is indicated in broken lines in Fig. 4. The bar is then swung into a substantially vertical position, the slot taking over the tongue. The first full-line bar at the left in Fig. 4 is shown partly swung into position and the next bar is shown in final position. In this position the bar is held against any substantial movement in any direction except the reverse of the assembling movement. The slot 32 is designed to make a close enough fit with tongue 22 to prevent any substantial endwise, up and down play. The engagement of the side of the bar with the edge of projection 21 prevents any movement to the right and the engagement of the opposite side of the bar just below notch 33, with the shoulder 24 formed between notch 25 and the edge of plate 20 prevents any right line movement of the bar to the left.

The lower cross piece, as here shown as an example, is a flat strip 37 located in a horizontal plane and provided with holes or slots 39 spaced in accordance with the spacing of the bars 27. On the lower end of each bar is a tongue 38 arranged to be stepped in the corresponding slot of the lower cross piece 37. This provides a dowel pin connection which anchors the lower ends of the bars against swinging in the one direction in which they were otherwise free to move, namely, the reverse of assembling movement.

Provision is made for preventing endwise movement of the lower cross piece relative to the upper cross piece. As here shown as an example, this is accomplished by reversing the direction of at least one tongue 22 and notch 25. To this end, in the present embodiment, six eyeleted bars are shown. The tongue for five of them are uniformly faced, namely, to the left as viewed in Figs. 1 and 4, the notches 25 extending to the right. For the sixth bar, the last to the right in Figs. 1 and 4, the tongue and notch face in the opposite direction. The assembly of the corresponding bar is accomplished as described except that it is in the opposite direction. For convenience of manufacture the end projection 21 is made wider than the others and carries the two oppositely faced tongues 22, as will be apparent from the drawings. When the several bars are assembled as described and anchored in the bottom cross piece, the latter cannot move endwise to cant the whole supplemental frame because the lower ends of part of the bars cannot swing in one direction and at least one bar cannot swing in the opposite direction. More specifically as viewed in Fig. 1, the lower ends of the five bars at the left cannot swing to the right and the other bar is prevented from having its lower end swing to the left. Consequently, the supplemental frame forms a substantially rigid portable unit.

Provision is made for preventing the lower cross piece and the bars from becoming separated. As here shown as an example, the tongues 38 of the two end bars, where they project below the cross piece 37, are twisted, as shown in Fig. 1, to prevent their withdrawal. This fixes the relative position of the two cross pieces. All the tongues 38 may be so twisted but no more than two is necessary.

With the construction described the supplemental frame parts are readily assembled, without extraneous securing devices and without complicated operations, into a unitary structure independent of the main frame and one that lends itself to ready assembly of the resistor.

In the embodiment here shown the resistor is a closely coiled wire 40 having straight end portions 41, 42. As shown in Fig. 1 the wire is threaded through all the eyelets of the bottom row, then in a return bend course through the eyelets of three bars, then through all the eyelets of the top row, and finally back and forth through the eyelets of the other three bars. The wire is conveniently assembled after the supplemental unit is assembled but before it is placed in the main frame.

While the supplemental frame may be assembled and secured in the main frame in various ways, as here shown as an example, the bottom cross piece 37 has, at its ends, down-turned feet 45 provided with tongues 43 which enter corresponding slots in the base 11 (Fig. 1). The top cross piece 20 has end tongues 44 which enter corresponding slots in the end standards 12, the inherent resiliency of the latter permitting them to be sprung apart far enough to allow insert of tongues 44. With the top 13 removed, the supplemental frame is assembled in the main frame in the manner described. The grid wires 17 are then put in place and the top secured by any suitable securing devices (not shown). The ends 41, 42, of the resistor wire are connected with suitable terminals carried by the main frame, one terminal 46 being shown in Fig. 1.

What we claim is:—

1. An electric toaster comprising a main frame, a supplemental frame including upper and lower cross pieces and a plurality of apertured bars having a sidewise tongue and slot connection with the upper cross piece and a stepped dowel pin connection with the lower cross piece, and a resistor wire threaded through the apertures of said bars.

2. An electric toaster comprising a main frame, a supplemental frame including upper and lower cross pieces, a plurality of apertured bars having a sidewise tongue and slot connection with the upper cross piece and a stepped dowel pin connection with the lower cross piece, at least two of said bars being secured against separation from the lower cross piece, and a resistor wire threaded through the apertures of said bars.

3. An electric toaster comprising a main frame, a supplemental frame including upper and lower cross pieces, a plurality of apertured bars having a tongue and slot connection with the upper cross piece, tongues on the lower ends of said bars, the lower cross piece having slots for receiving said tongues, at least two of said tongues being twisted below the lower cross piece, and a resistor wire threaded through the apertures of said bars.

4. An electric toaster comprising a main frame, an upper cross piece mounted therein, a plurality of upright apertured bars, a plurality of sidewise extending tongues on the cross piece, the bars having slots for receiving said tongues, the slots being arranged to prevent endwise movement of the bars, mutually engaging abutments on the cross piece and bars for preventing sidewise rightline movement of the bars relative to the cross piece, means for anchoring the lower ends of the bars and a resistor wire threaded through the apertures of said bars.

5. An electric toaster comprising a main frame, an upper cross piece mounted therein, a plurality of upright apertured bars, a plurality of sidewise extending tongues on the cross piece, the bars having slots for receiving said tongues, the slots being arranged to prevent endwise movement of the bars, abutments on the cross piece for engaging both sides of a bar to prevent sidewise rightline movement of the bar, tongues on the lower ends of the bars, a lower cross piece having slots for receiving said tongues thereby to anchor the bars against tilting movement, and a resistor wire threaded through the apertures of said bars.

6. An electric toaster comprising a main frame, an upper cross piece mounted therein, a plurality of apertured bars, a plurality of sidewise extending tongues on the cross piece, the bars having slots for receiving said tongues, the slots being arranged to prevent endwise movement of the bars, abutments on the cross piece for engaging both sides of a bar to prevent sidewise right-line movement of the bar, the cross piece having notches adjacent the tongues whereby the bars may tilt about the tongues, means for anchoring the bars against tilting movement, and a resistor wire threaded through the apertures of said bars.

7. An electric toaster comprising a main frame, an upper cross piece mounted therein, a plurality of projections extending down from said cross piece, sidewise extending tongues on said projections, a plurality of upright apertured bars having slots for receiving said tongues, sidewise right-line movement of the bars in one direction being prevented by the engagement of the bars with said projections, abutments on the cross piece for engagement by the bars to prevent similar movement in the opposite direction, the cross piece having notches to permit the bars to be manipulated into a normal position by tilting, means for anchoring the lower ends of said bars to prevent a reverse tilting movement, and a resistor wire threaded through the apertures of said bars.

8. An electric toaster comprising a main frame and a supplemental frame including spaced cross pieces and a plurality of resistor supporting bars, said bars being individually interlocked with said cross pieces, the direction of interlocking of at least one bar being reversed whereby the supplemental frame forms a substantially rigid unit insertible in the main frame, and a resistor wire supported by said bars.

9. An electric toaster comprising a main frame and a supplemental frame, the supplemental frame including a cross piece, a plurality of resistor supporting bars individually interlocked with said cross piece to be held against movement except a tilting movement in one direction, a second cross piece in which the other ends of said bars are stepped, the direction of interlocking of at least one bar reversed to prevent canting of the supplemental frame, whereby the supplemental frame forms a substantially rigid unit insertible in the main frame, and a resistor wire supported by said bars.

10. An electric toaster comprising a main frame and a supplemental frame, the supplemental frame including spaced cross pieces and a plurality of resistor supporting bars, the bars having a sidewise tongue and slot connection with one cross piece, the direction of the tongue and slot connection for at least one bar being reversed, the bars being stepped in the other cross piece, whereby the supplemental frame forms a substantially rigid unit insertible in the main frame, and a resistor wire supported by said bars.

11. An electric toaster comprising a main frame and a suppplemental frame, the supplemental frame including spaced cross pieces, one cross piece having a plurality of sidewise extending tongues, the direction of at least one tongue being reversed, and a plurality of resistor supporting bars having slots for receiving said tongues, the other ends of said bars being stepped in the other cross piece, and a resistor wire supported by said bars.

12. An electric toaster comprising a main frame having a base and end standards, and a supplemental frame including spaced cross pieces and a plurality of resistor supporting bars, said bars and the cross pieces being interlocked to form a substantially rigid unit, one cross piece having tongues for insertion in slots in the end standards, the other cross piece having tongues stepped in slots in the base, and a resistor wire supported by said bars.

In testimony whereof we have hereunto set our hands.

ALONZO A. WARNER.
ANDERS F. SVENSK.